(12) United States Patent
Vaddempudi et al.

(10) Patent No.: US 11,150,954 B2
(45) Date of Patent: Oct. 19, 2021

(54) MITIGATING RESOURCE SCHEDULING CONFLICTS IN A CLOUD PLATFORM

(71) Applicant: ServiceNow, Inc., Santa Clara, CA (US)

(72) Inventors: Sharath Vaddempudi, Bellevue, WA (US); Kavish Jain, San Jose, CA (US); Yerjan Khurmyetbyek, Kirkland, WA (US); Atul Saini, Bellevue, WA (US); Swathi Pattapu, Kirkland, WA (US)

(73) Assignee: ServiceNow, Inc., Santa Clara, CA (US)

( * ) Notice: Subject to any disclaimer, the term of this patent is extended or adjusted under 35 U.S.C. 154(b) by 254 days.

(21) Appl. No.: 16/267,121

(22) Filed: Feb. 4, 2019

(65) Prior Publication Data

US 2020/0250000 A1 Aug. 6, 2020

(51) Int. Cl.
*G06F 9/46* (2006.01)
*G06F 9/50* (2006.01)
*G06F 9/48* (2006.01)

(52) U.S. Cl.
CPC .......... *G06F 9/5038* (2013.01); *G06F 9/4887* (2013.01); *G06F 9/5072* (2013.01); *G06F 9/5083* (2013.01); *G06F 2209/503* (2013.01); *G06F 2209/5022* (2013.01)

(58) Field of Classification Search
None
See application file for complete search history.

(56) References Cited

U.S. PATENT DOCUMENTS

| | | |
|---|---|---|
| 6,321,229 B1 | 11/2001 | Goldman |
| 6,678,887 B1 | 1/2004 | Hallman |
| 6,799,189 B2 | 9/2004 | Huxoll |
| 6,816,898 B1 | 11/2004 | Scarpelli |
| 6,895,586 B1 | 5/2005 | Brasher |
| 7,020,706 B2 | 3/2006 | Cates |
| 7,027,411 B1 | 4/2006 | Pulsipher |
| 7,350,209 B2 | 3/2008 | Shum |
| 7,392,300 B2 | 6/2008 | Anantharangachar |
| 7,617,073 B2 | 11/2009 | Trinon |
| 7,685,167 B2 | 3/2010 | Mueller |
| 7,716,353 B2 | 5/2010 | Golovinsky |
| 7,769,718 B2 | 8/2010 | Murley |
| 7,890,802 B2 | 2/2011 | Gerber |
| 7,925,981 B2 | 4/2011 | Pourheidari |
| 7,933,927 B2 | 4/2011 | Dee |
| 7,945,860 B2 | 5/2011 | Vambenepe |

(Continued)

OTHER PUBLICATIONS

International Search Report & Written Opinion for PCT Application No. PCT/US2020/016095 dated Apr. 24, 2020; 17 pgs.

*Primary Examiner* — Bing Zhao
(74) *Attorney, Agent, or Firm* — Fletcher Yoder PC

(57) ABSTRACT

Various approaches are described to manage the execution of operations. Such operations may be performed without human intervention and may help maintain functionality of a cloud platform or client instances. In one aspect of the present approach, the number and/or type of automations starting in a given time frame may be limited to maintain an even or consistent distribution of resource usage. In a further aspect, the number and/or type of concurrent automations may be limited to a defined threshold to maintain an even or consistent distribution of resource usage.

14 Claims, 15 Drawing Sheets

(56) References Cited

U.S. PATENT DOCUMENTS

| | | |
|---|---|---|
| 8,082,222 B2 | 12/2011 | Rangarajan |
| 8,151,261 B2 | 4/2012 | Sirota |
| 8,380,645 B2 | 2/2013 | Kowalski |
| 8,402,127 B2 | 3/2013 | Solin |
| 8,554,750 B2 | 10/2013 | Rangaranjan |
| 8,612,408 B2 | 12/2013 | Trinon |
| 8,646,093 B2 | 2/2014 | Myers |
| 8,745,040 B2 | 6/2014 | Kowalski |
| 8,812,539 B2 | 8/2014 | Milousheff |
| 8,818,994 B2 | 8/2014 | Kowalski |
| 8,832,652 B2 | 9/2014 | Mueller |
| 8,984,125 B2 * | 3/2015 | Kanemasa .......... H04L 67/1002 709/224 |
| 9,015,188 B2 | 4/2015 | Behne |
| 9,037,536 B2 | 5/2015 | Vos et al. |
| 9,065,783 B2 | 6/2015 | Ding |
| 9,098,322 B2 | 8/2015 | Apte |
| 9,122,552 B2 | 9/2015 | Whitney |
| 9,137,115 B2 | 9/2015 | Mayfield |
| 9,317,327 B2 | 4/2016 | Apte |
| 9,323,801 B2 | 4/2016 | Morozov |
| 9,363,252 B2 | 6/2016 | Mueller |
| 9,412,084 B2 | 9/2016 | Kowalski |
| 9,467,344 B2 | 10/2016 | Gere |
| 9,535,737 B2 | 1/2017 | Joy |
| 9,557,969 B2 | 1/2017 | Sharma |
| 9,613,070 B2 | 4/2017 | Kumar |
| 9,645,473 B2 | 5/2017 | Miller |
| 9,654,473 B2 | 5/2017 | Miller |
| 9,659,051 B2 | 5/2017 | Hutchins |
| 9,766,935 B2 | 9/2017 | Kelkar |
| 9,792,387 B2 | 10/2017 | George |
| 9,805,322 B2 | 10/2017 | Kelkar |
| 9,852,165 B2 | 12/2017 | Morozov |
| 10,002,203 B2 | 6/2018 | George |
| 2017/0078442 A1 | 3/2017 | Pacella et al. |
| 2019/0034223 A1 | 1/2019 | Yang |

* cited by examiner

| STAGGER INPUTS | STAGGER LOOKUP WINDOW | FETCH SCHEDULED OPERATIONS AND FIND COUNT OF OVERLAPPING SCHEDULES | CONFLICTING WINDOWS |
|---|---|---|---|
| 2300Hz<br><br>StaggerRate =<br>STAGGER WINDOW = 7 Min<br>START TIME = 1300 Hrs<br>END TIME = 2300 Hrs<br><br>1300 Hrs | 700<br><br><br>1307 Hrs<br><br>1253 Hrs | 354<br>354<br>354<br>354 | 702<br>702 |
| LEGENDS | ▨ STAGGER LOOKUP WINDOW<br>▨ SCHEDULED OP STAGGER WINDOW<br>▨ STAGGER RATE EXCEEDED | | |

*FIG. 10*

MITIGATING RESOURCE SCHEDULING CONFLICTS IN A CLOUD PLATFORM

BACKGROUND

The present disclosure relates generally to management of internal automations used in the maintenance and operation of cloud platform, including maintenance of client instances on such a platform without human intervention.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Organizations, regardless of size, rely upon access to information technology (IT) and data and services for their continued operation and success. A respective organization's IT infrastructure may have associated hardware resources (e.g. computing devices, load balancers, firewalls, switches, etc.) and software resources (e.g. productivity software, database applications, custom applications, and so forth). Over time, more and more organizations have turned to cloud computing approaches to supplement or enhance their IT infrastructure solutions.

Cloud computing relates to the sharing of computing resources that are generally accessed via the Internet. In particular, a cloud computing infrastructure allows users, such as individuals and/or enterprises, to access a shared pool of computing resources, such as servers, storage devices, networks, applications, and/or other computing based services. By doing so, users are able to access computing resources on demand that are located at remote locations and these resources may be used to perform a variety of computing functions (e.g., storing and/or processing large quantities of computing data). For enterprise and other organization users, cloud computing provides flexibility in accessing cloud computing resources without accruing large up-front costs, such as purchasing expensive network equipment or investing large amounts of time in establishing a private network infrastructure. Instead, by utilizing cloud computing resources, users are able redirect their resources to focus on their enterprise's core functions.

As part of supporting such cloud-based computing resources, a number of automations (e.g., automated tasks or operations) may performed at defined intervals or as needed. By way of example, such automations may be related to backing up or archiving data, updating or patching applications, adjusting or optimizing user or resource permissions and so forth. Such operations may utilize resources of the cloud platform and may operate completely or somewhat independent of one another. As a result, implementation of automations to support the cloud platform (e.g., client instances maintained on the cloud platform) may negatively impact one another and, more generally, resources used to implement or support the cloud platform, which may impact the ability for users to run their own applications on the platform.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In accordance with aspects of the present approach, one or more techniques may be employed to manage the implementation of automations in the context of supporting a cloud platform, including client instances on such a cloud platform. In one such implementation, a resource throttling service, as described herein, may be employed to keep concurrently run automations within defined limits in terms of their resource utilization. In a further implementation, an operation staggering service may be employed that limits or manages the starting times of automations scheduled to run in temporal proximity to one another, such as concurrently. In such implementations, resources managed or used on the cloud, such as resources allocated to an instance, may be managed so as to allow client or customer to continue using their application in an unhindered or unimpaired manner.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which:

FIG. 10 depicts a timeline view of a proposed start time for an automated operation having conflicts with other operations, in accordance with aspects of the present approach;

DETAILED DESCRIPTION

Figure 1:
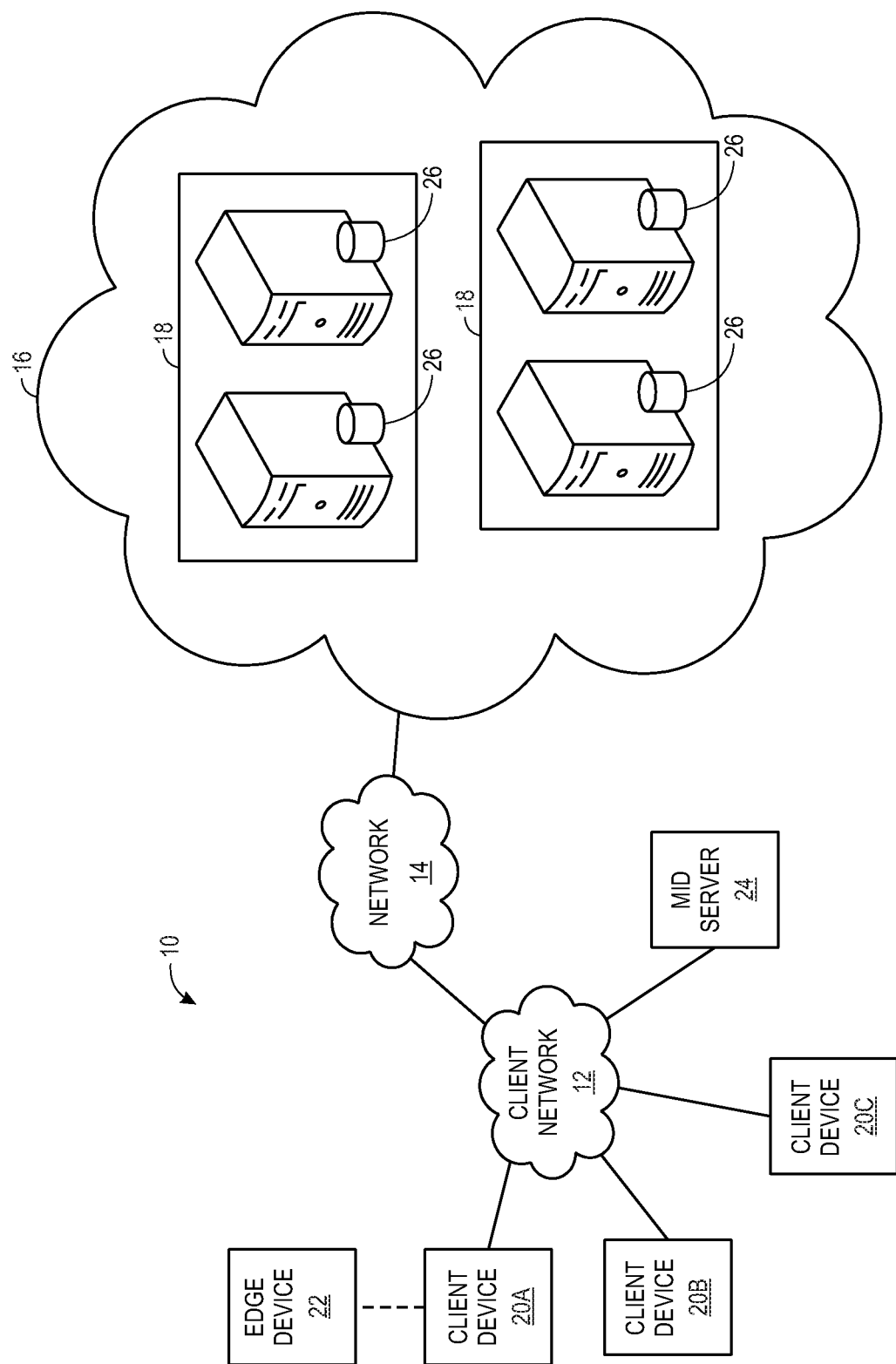
FIG. 1 is a block diagram of an embodiment of a cloud architecture in which embodiments of the present disclosure may operate.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As used herein, the term "computing system" refers to an electronic computing device such as, but not limited to, a single computer, virtual machine, virtual container, host, server, laptop, and/or mobile device, or to a plurality of electronic computing devices working together to perform the function described as being performed on or by the computing system. As used herein, the term "medium" refers to one or more non-transitory, computer-readable physical media that together store the contents described as being stored thereon. Embodiments may include non-volatile secondary storage, read-only memory (ROM), and/or random-access memory (RAM). As used herein, the term "application" refers to one or more computing modules, programs, processes, workloads, threads and/or a set of computing instructions executed by a computing system. Example embodiments of an application include software modules, software objects, software instances and/or other types of executable code. As used herein, the term "configuration item" or "CI" refers to a record for any component (e.g., computer, device, piece of software, database table, script, webpage, piece of metadata, and so forth) in an enterprise network, for which relevant data, such as manufacturer, vendor, location, or similar data, is stored in a database that is the source of verified or accurate information, for example a configuration management database (CMDB). The terms "automation" and "operation" are generally used interchangeably herein, though in certain contexts an automation may be further understood to include connotations of being an automated or scheduled operation performed with little or no human intervention. However, an operation should not necessarily be construed as being unscheduled or involving human intervention unless explicitly stated. Instead, in most if not all discussion herein, an automation and operation should be understood as being similar or identical in scope, if not context.

As discussed herein, various approaches are described to manage the execution of internal automations (e.g., automated tasks, operations, or processes) in the context of a cloud platform, such as a cloud platform supporting one or more client instances. Such automations are typically performed without human intervention and help maintain functionality of the cloud platform or instances, such as by providing or facilitating services related to data backup or archiving, application or operating system upgrading or patching, security or security screening, user or resource management, and so forth. However, such automations also may each utilize some amount of a set allocation of resources for the platform or instance, which may leave less resources available for the applications for which the platform or instance is primarily utilized.

In particular, in conventional approaches, such automations may be scheduled or started without restrictions, such as without time restrictions, or without consideration of what other automations are currently running or scheduled to run at that time. As a consequence, an automation may result in high-resource usage and a corresponding impact on applications or resources utilized by a client or customer.

Thus, approaches such as those discussed herein may be of value in maintaining available resource for those applications and services primarily supported by the cloud platform, such as within a given client instance. In one aspect, denoted herein as operation staggering, the number and/or type of automations starting in a given time frame may be limited, such as based upon a defined stagger rate and stagger window, to maintain an even or consistent distribution of resource usage. That is, in such an approach, automations may be distributed based on start time to maintain some level of resource availability.

In a further aspect, denoted herein as resource throttling, the number and/or type of concurrent automations may be limited to a defined threshold to maintain an even or consistent distribution of resource usage. That is, in such an approach, the number of concurrently running automations within a given time window may be limited based upon the defined throttle to maintain some level of resource availability.

With the preceding in mind, the following figures relate to various types of generalized system architectures or configurations that may be employed to provide services to an organization in a multi-instance framework and on which the present approaches may be employed. Correspondingly, these system and platform examples may also relate to systems and platforms on which the techniques discussed herein may be implemented or otherwise utilized. Turning now to FIG. 1, a schematic diagram of an embodiment of a cloud computing system 10 where embodiments of the present disclosure may operate, is illustrated. The cloud computing system 10 may include a client network 12, a network 14 (e.g., the Internet), and a cloud-based platform 16. In some implementations, the cloud-based platform 16 may be a configuration management database (CMDB) platform. In one embodiment, the client network 12 may be a local private network, such as local area network (LAN) having a variety of network devices that include, but are not limited to, switches, servers, and routers. In another embodiment, the client network 12 represents an enterprise network that could include one or more LANs, virtual networks, data centers 18, and/or other remote networks. As shown in FIG. 1, the client network 12 is able to connect to one or more client devices 20A, 20B, and 20C so that the client devices are able to communicate with each other and/or with the network hosting the platform 16. The client devices 20 may be computing systems and/or other types of computing devices generally referred to as Internet of Things (IoT) devices that access cloud computing services, for example, via a web browser application or via an edge device 22 that may act as a gateway between the client devices 20 and the platform 16. FIG. 1 also illustrates that the client network 12 includes an administration or managerial device or server, such as a management, instrumentation, and discovery (MID) server 24 that facilitates communication of data between the network hosting the platform 16, other external applications, data sources, and services, and the client network 12. Although not specifically illustrated in FIG. 1, the client network 12 may also include a connecting network device (e.g., a gateway or router) or a combination of devices that implement a customer firewall or intrusion protection system.

For the illustrated embodiment, FIG. 1 illustrates that client network 12 is coupled to a network 14. The network 14 may include one or more computing networks, such as other LANs, wide area networks (WAN), the Internet, and/or other remote networks, to transfer data between the client devices 20 and the network hosting the platform 16. Each of the computing networks within network 14 may contain wired and/or wireless programmable devices that operate in the electrical and/or optical domain. For example, network 14 may include wireless networks, such as cellular networks (e.g., Global System for Mobile Communications (GSM) based cellular network), IEEE 802.11 networks, and/or other suitable radio-based networks. The network 14 may also employ any number of network communication protocols, such as Transmission Control Protocol (TCP) and Internet Protocol (IP). Although not explicitly shown in FIG. 1, network 14 may include a variety of network devices, such as servers, routers, network switches, and/or other network hardware devices configured to transport data over the network 14.

In FIG. 1, the network hosting the platform 16 may be a remote network (e.g., a cloud network) that is able to communicate with the client devices 20 via the client network 12 and network 14. The network hosting the platform 16 provides additional computing resources to the client devices 20 and/or the client network 12. For example, by utilizing the network hosting the platform 16, users of the client devices 20 are able to build and execute applications for various enterprise, IT, and/or other organization-related functions. In one embodiment, the network hosting the platform 16 is implemented on the one or more data centers 18, where each data center could correspond to a different geographic location. Each of the data centers 18 includes a plurality of virtual servers 26 (which may be referred to herein as application nodes, application servers, virtual server instances, application instances, or application server instances), where each virtual server 26 can be implemented on a physical computing system, such as a single electronic computing device (e.g., a single physical hardware server) or across multiple-computing devices (e.g., multiple physical hardware servers). Examples of virtual servers 26 include, but are not limited to a web server (e.g., a unitary Apache installation), an application server (e.g., unitary JAVA Virtual Machine), and/or a database server (e.g., a unitary relational database management system (RDBMS) catalog).

To utilize computing resources within the platform 16, network operators may choose to configure the data centers 18 using a variety of computing infrastructures. In one embodiment, one or more of the data centers 18 are configured using a multi-tenant cloud architecture, such that one of the server instances 26 handles requests from and serves multiple customers. Data centers 18 with multi-tenant cloud architecture commingle and store data from multiple customers, where multiple customer instances are assigned to one of the virtual servers 26. In a multi-tenant cloud architecture, the particular virtual server 26 distinguishes between and segregates data and other information of the various customers. For example, a multi-tenant cloud architecture could assign a particular identifier for each customer in order to identify and segregate the data from each customer. Generally, implementing a multi-tenant cloud architecture may suffer from various drawbacks, such as a failure of a particular one of the server instances 26 causing outages for all customers allocated to the particular server instance.

In another embodiment, one or more of the data centers 18 are configured using a multi-instance cloud architecture to provide every customer its own unique customer instance or instances. For example, a multi-instance cloud architecture could provide each customer instance with its own dedicated application server(s) and dedicated database server(s). In other examples, the multi-instance cloud architecture could deploy a single physical or virtual server 26 and/or other combinations of physical and/or virtual servers 26, such as one or more dedicated web servers, one or more dedicated application servers, and one or more database servers, for each customer instance. In a multi-instance cloud architecture, multiple customer instances could be installed on one or more respective hardware servers, where each customer instance is allocated certain portions of the physical server resources, such as computing memory, storage, and processing power. By doing so, each customer instance has its own unique software stack that provides the benefit of data isolation, relatively less downtime for customers to access the platform 16, and customer-driven upgrade schedules. An example of implementing a customer instance within a multi-instance cloud architecture will be discussed in more detail below with reference to FIG. 2.

Figure 2:
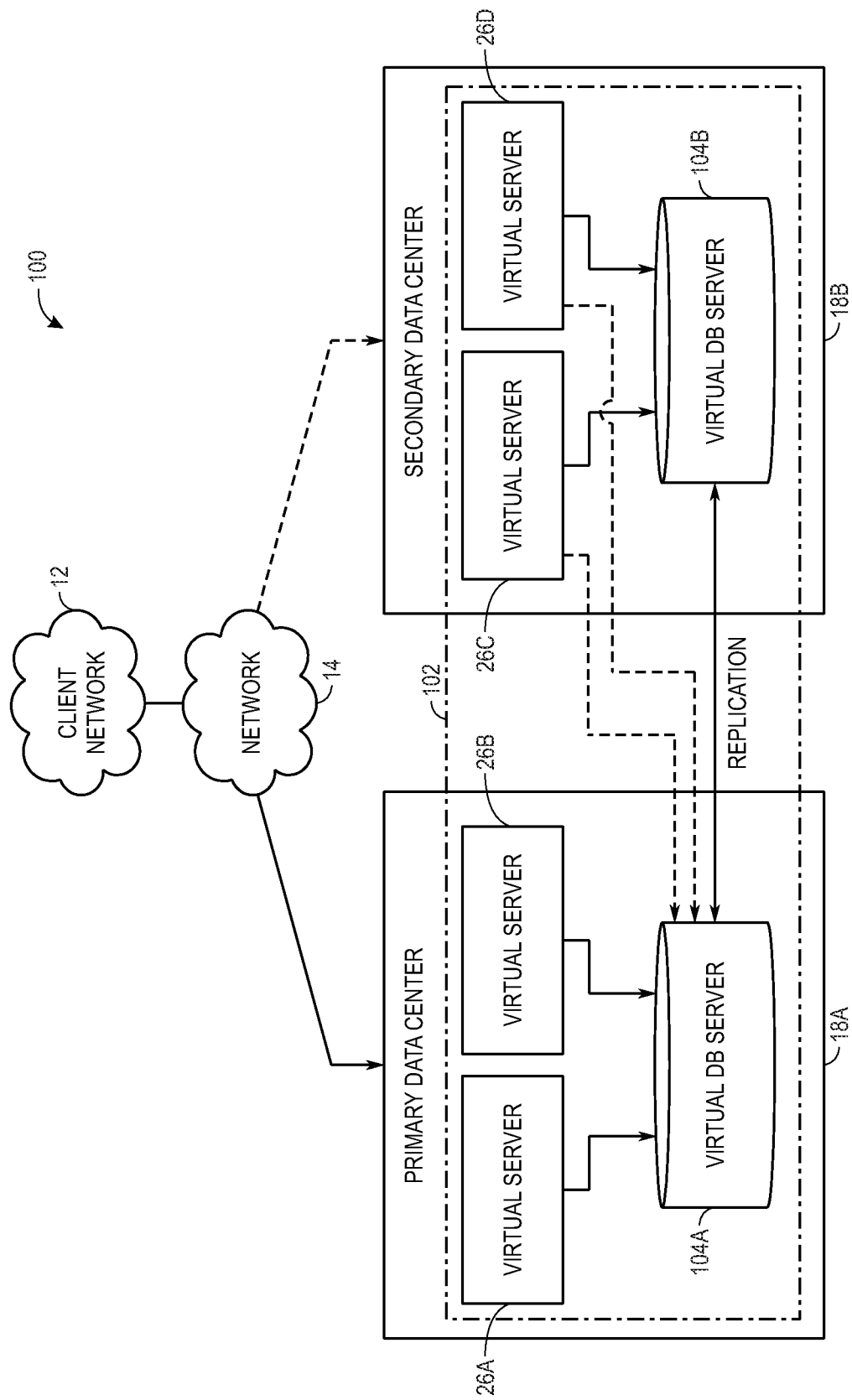
FIG. 2 is a schematic diagram of an embodiment of a multi-instance cloud architecture in which embodiments of the present disclosure may operate.

FIG. 2 is a schematic diagram of an embodiment of a multi-instance cloud architecture 100 where embodiments of the present disclosure may operate. FIG. 2 illustrates that the multi-instance cloud architecture 100 includes the client network 12 and the network 14 that connect to two (e.g., paired) data centers 18A and 18B that may be geographically separated from one another. Using FIG. 2 as an example, network environment and service provider cloud infrastructure client instance 102 (also referred to herein as a client instance 102) is associated with (e.g., supported and enabled by) dedicated virtual servers (e.g., virtual servers 26A, 26B, 26C, and 26D) and dedicated database servers (e.g., virtual database servers 104A and 104B). Stated another way, the virtual servers 26A-26D and virtual database servers 104A and 104B are not shared with other client instances and are specific to the respective client instance 102. In the depicted example, to facilitate availability of the client instance 102, the virtual servers 26A-26D and virtual database servers 104A and 104B are allocated to two different data centers 18A and 18B so that one of the data centers 18 acts as a backup data center. Other embodiments of the multi-instance cloud architecture 100 could include other types of dedicated virtual servers, such as a web server. For example, the client instance 102 could be associated with (e.g., supported and enabled by) the dedicated virtual servers 26A-26D, dedicated virtual database servers 104A and 104B, and additional dedicated virtual web servers (not shown in FIG. 2).

Although FIGS. 1 and 2 illustrate specific embodiments of a cloud computing system 10 and a multi-instance cloud architecture 100, respectively, the disclosure is not limited to the specific embodiments illustrated in FIGS. 1 and 2. For instance, although FIG. 1 illustrates that the platform 16 is implemented using data centers, other embodiments of the platform 16 are not limited to data centers and can utilize other types of remote network infrastructures. Moreover, other embodiments of the present disclosure may combine one or more different virtual servers into a single virtual server or, conversely, perform operations attributed to a single virtual server using multiple virtual servers. For instance, using FIG. 2 as an example, the virtual servers 26A, 26B, 26C, 26D and virtual database servers 104A, 104B may be combined into a single virtual server. Moreover, the present approaches may be implemented in other architectures or configurations, including, but not limited to, multi-tenant architectures, generalized client/server implementations, and/or even on a single physical processor-based device configured to perform some or all of the operations discussed herein. Similarly, though virtual servers or machines may be referenced to facilitate discussion of an implementation, physical servers may instead be employed as appropriate. The use and discussion of FIGS. 1 and 2 are only examples to facilitate ease of description and explanation and are not intended to limit the disclosure to the specific examples illustrated therein.

As may be appreciated, the respective architectures and frameworks discussed with respect to FIGS. 1 and 2 incorporate computing systems of various types (e.g., servers, workstations, client devices, laptops, tablet computers, cellular telephones, and so forth) throughout. For the sake of completeness, a brief, high level overview of components typically found in such systems is provided. As may be appreciated, the present overview is intended to merely provide a high-level, generalized view of components typical in such computing systems and should not be viewed as limiting in terms of components discussed or omitted from discussion.

Figure 3:
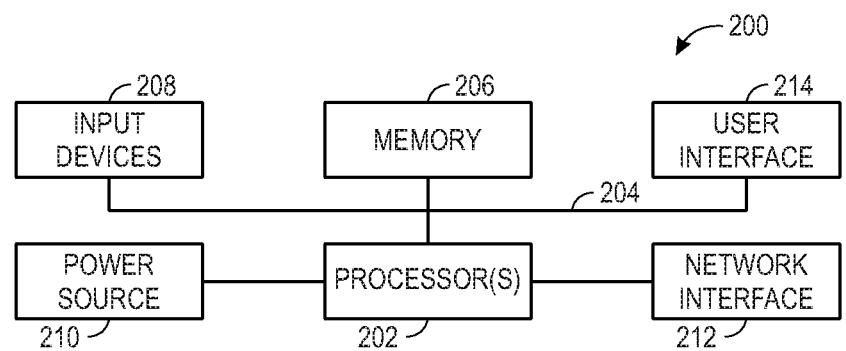
FIG. 3 is a block diagram of a computing device utilized in a computing system that may be present in FIG. 1 or 2, in accordance with aspects of the present disclosure.

By way of background, it may be appreciated that the present approach may be implemented using one or more processor-based systems such as shown in FIG. 3. Likewise, applications and/or databases utilized in the present approach may be stored, employed, and/or maintained on such processor-based systems. As may be appreciated, such systems as shown in FIG. 3 may be present in a distributed computing environment, a networked environment, or other multi-computer platform or architecture. Likewise, systems such as that shown in FIG. 3, may be used in supporting or communicating with one or more virtual environments or computational instances on which the present approach may be implemented.

With this in mind, an example computer system may include some or all of the computer components depicted in FIG. 3. FIG. 3 generally illustrates a block diagram of example components of a computing system 200 and their potential interconnections or communication paths, such as along one or more busses. As illustrated, the computing system 200 may include various hardware components such as, but not limited to, one or more processors 202, one or more busses 204, memory 206, input devices 208, a power source 210, a network interface 212, a user interface 214, and/or other computer components useful in performing the functions described herein.

The one or more processors 202 may include one or more microprocessors capable of performing instructions stored in the memory 206. Additionally or alternatively, the one or more processors 202 may include application-specific integrated circuits (ASICs), field-programmable gate arrays (FPGAs), and/or other devices designed to perform some or all of the functions discussed herein without calling instructions from the memory 206.

With respect to other components, the one or more busses 204 include suitable electrical channels to provide data and/or power between the various components of the computing system 200. The memory 206 may include any tangible, non-transitory, and computer-readable storage media. Although shown as a single block in FIG. 1, the memory 206 can be implemented using multiple physical units of the same or different types in one or more physical locations. The input devices 208 correspond to structures to input data and/or commands to the one or more processors 202. For example, the input devices 208 may include a mouse, touchpad, touchscreen, keyboard and the like. The power source 210 can be any suitable source for power of the various components of the computing device 200, such as line power and/or a battery source. The network interface 212 includes one or more transceivers capable of communicating with other devices over one or more networks (e.g., a communication channel). The network interface 212 may provide a wired network interface or a wireless network interface. A user interface 214 may include a display that is configured to display text or images transferred to it from the one or more processors 202. In addition and/or alternative to the display, the user interface 214 may include other devices for interfacing with a user, such as lights (e.g., LEDs), speakers, and the like.

Figure 4:
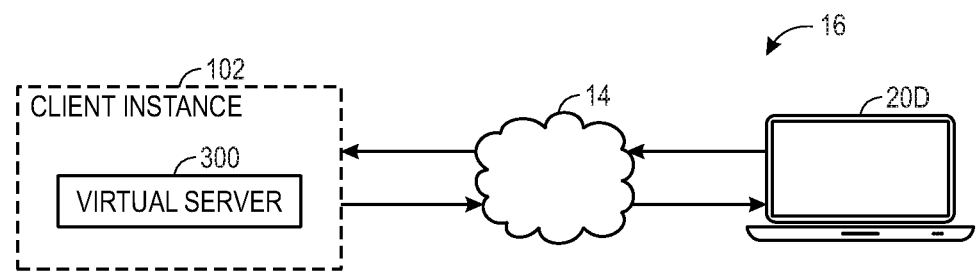
FIG. 4 is a block diagram illustrating an embodiment in which a virtual server supports and enables the client instance, in accordance with aspects of the present disclosure.

With the preceding in mind, FIG. 4 is a block diagram illustrating an embodiment in which a virtual server 300 supports and enables a client instance 102, according to one or more disclosed embodiments. More specifically, FIG. 4 illustrates an example of a portion of a service provider cloud infrastructure, including the cloud-based platform 16 discussed above. The cloud-based platform 16 is connected to a client device 20D via the network 14 to provide a user interface to network applications executing within the client instance 102 (e.g., via a web browser of the client device 20D). Client instance 102 is supported by virtual servers 26 similar to those explained with respect to FIG. 2, and is illustrated here to show support for the disclosed functionality described herein within the client instance 102. Cloud provider infrastructures are generally configured to support a plurality of end-user devices, such as client device 20D, concurrently, wherein each end-user device is in communication with a respective single client instance 102. Also, cloud provider infrastructures may be configured to support any number of client instances, such as client instance 102, concurrently, with each of the instances in communication with one or more end-user devices. As mentioned above, an end-user may also interface with client instance 102 using an application that is executed within a web browser.

With the preceding in mind, and as noted above, the present approaches relate to management of internal automations (e.g., backup and archiving tasks, instance cloning or migrations, updating and patching of software and operating systems, and so forth) that help maintain a client instance (or other aspect of a cloud platform) with little or no human intervention. In particular, such management of internal automations may be beneficial due to client instances often sharing hardware or other resources used to support applications running on the instances. As a result, the execution of automations, or of too many automations concurrently, may be a significant load on the system that may reduce resource availability for customer applications.

In a first approach discussed herein, resource throttling (e.g., a resource throttling service (RTS) executing on a server or other processor-based device supporting a given instance) is employed that acts to keep the number of concurrent automations executing within defined limits. Such limits may apply globally to all automations or may apply only to certain automations or types of automations (e.g., certain types of automations may be limited while others are not or different types of automations may have different concurrency limitations, such as based upon their impact on resources). Resource throttling as discussed herein may support any suitable resource in a cloud infrastructure (e.g., application servers, database server, network infrastructure, disk and processor resources, and so forth) and/or may be used to throttle resources for suitable automations (e.g., Upgrade, Move, Clone, Transfer, Patch, Restore, Backup, Copy, Stop, Start, Provision, Restart, Write Audit, Read Audit, Rename, Repoint, Switch DNS, and so forth).

Further, resource characteristics may be taken into account as part of resource throttling, which may help address a lack of homogeneity typical in IT environments. Examples of such resource characteristics include, but are not limited to, server model or SKU, datacenter location, datacenter time zone, server usage (e.g., application, database, primary, standby, backup), and so forth. For example, resource availability and properties are typically not homogeneous across pods and servers due to, among other reasons, each generation of hardware having different capabilities as well as due to other characteristics noted above. The present approach can be used to optimize or maximize automation throughput by taking into account these differing resource characteristics as part of throttling (such as by setting a suitable threshold for total or specific automations of a given set of resources).

Further, as noted above, the automations themselves are not homogeneous, but may be of varying types and may vary in resource impact. For example, some automations may be part of other automations, may vary in terms of run durations, may run with or without downtime, may conflict with other automations, may be required to be throttled as a group or standalone, may have different orchestrators, and so forth. These factors may also be taken into account in accordance with the present approach in terms of setting concurrent thresholds suitable for total and/or specific automations. Further, to accommodate all of these use scenarios, resource throttling as described herein may provide dynamic throttling with the ability to group random sets of operations and also define sub operations to be throttled.

To facilitate explanation and discussion of the present approaches, various examples of process flows and corresponding pseudocode are provided below. In these examples, concepts and terms are provided in the context of a platform employing a configuration management database (CMDB)-based platform. In such a CMDB context, and as reflected in the examples below, each resource is referenced by a 32-character-long unique string (i.e., a "sys id"). Correspondingly, resource throttling as discussed herein relates to the sys id, resource type, and throttle limit based on a given automation or automation type and application instance. The proposed algorithm has a space complexity of O(n), meaning that the space usage grows linearly with the size of the data (n). The time complexity is O(log(n)), meaning that the time need for this process grows logarithmically with the size of the data.

Figure 5:
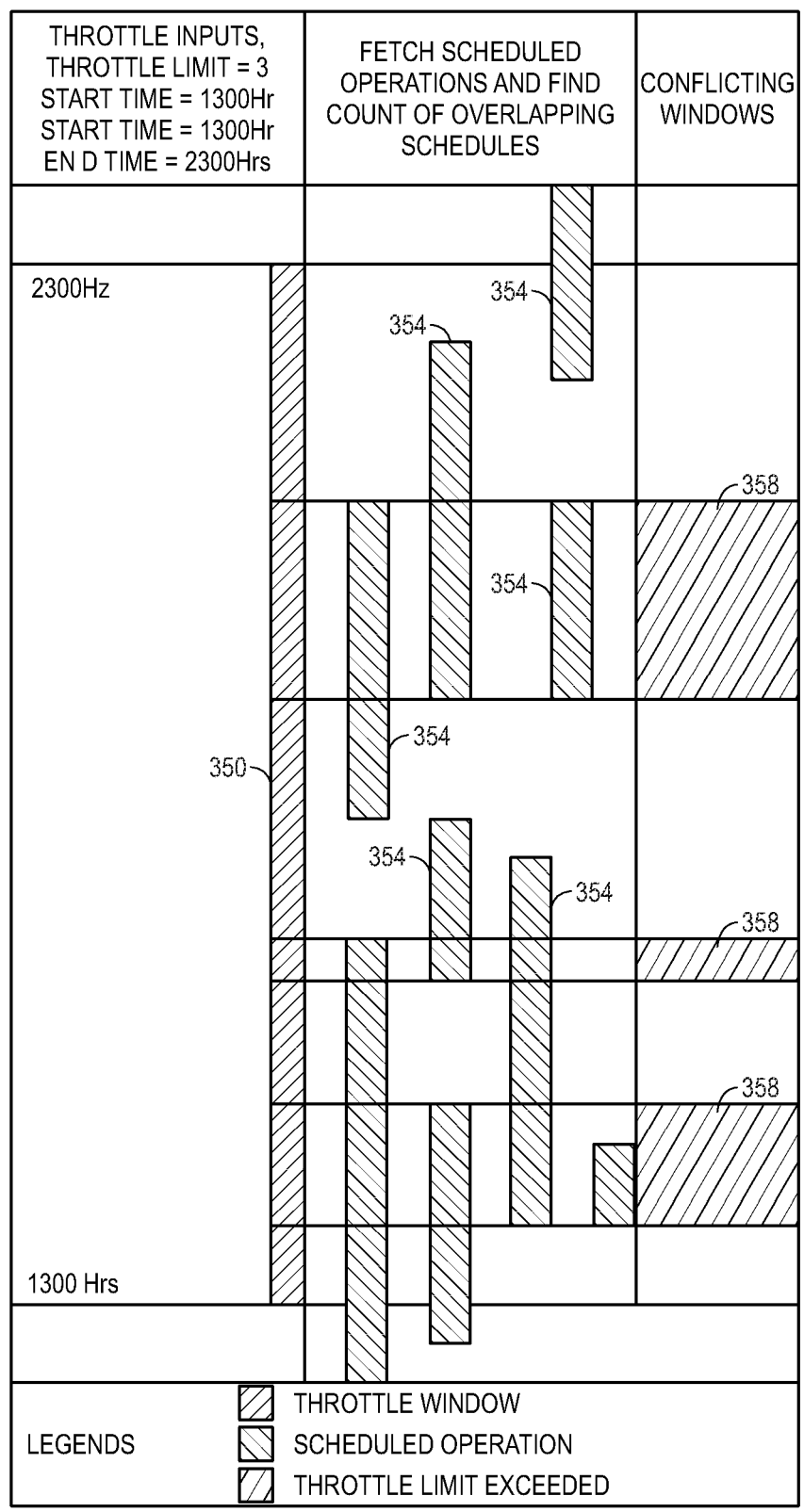
FIG. 5 depicts a timeline view of a proposed schedule for an automated operation having conflicts with other operations, in accordance with aspects of the present approach.

With the preceding in mind, FIG. 5 depicts a visual representation of a timeline (read from right to left and bottom to top in the provided depiction) in which an automation is to be scheduled. In this example, for the automation or automation type in question the throttle limit (i.e., the limit or threshold on the number of concurrent automations of this type) is set to three, meaning no more than three of this type of automation can execute concurrently. A start time of 1300 hours and an end time of 2300 hours for the automation is specified. This time dimension and particular times are reflected vertically in the figure along with a vertical bar 350 representing the throttle window in which the automation is to run.

Vertically adjacent, other scheduled automations or operations 354 are illustrated along the same time dimension. Based on the concurrency limit of three and the existing scheduled automations, multiple conflicting time windows 358 are present where the proposed time would be inconsistent with the concurrency limitation for this type of automation would be exceeded. Based on this result, running the automation at the proposed time would not be permitted as doing so would impact resources needed to support operation of customer applications within the impacted client instance 102. The present approach relates algorithms for identifying such conflicting time windows in an automated manner and providing such conflicts to a user to allow scheduling of automations so as to avoid such conflicts. As may be appreciated such algorithms may be implemented as automated services or processes on a device running on a client instance 102 or at a data center in support of the client instance 102.

With this in mind, and turning to FIG. 6, a process flow is illustrated in conjunction with pseudo code (below) that may be executed to determine the presence or absence of conflicting time windows, i.e., to confirm that automation concurrency or throttle limits are met. In this example, the algorithm steps may be implemented as a high-level application programming interface (API) that can be used to check for automation concurrency conflicts in a given maintenance window. The API receives input data in a specified format and calls an internal function, described in greater detail below. Nomenclature employed corresponds generally to conventional instruction and argument representation practices and should be understood to be representative of the general logic and arguments employed and not exclusive or exhaustive of such approaches.

Figure 6:
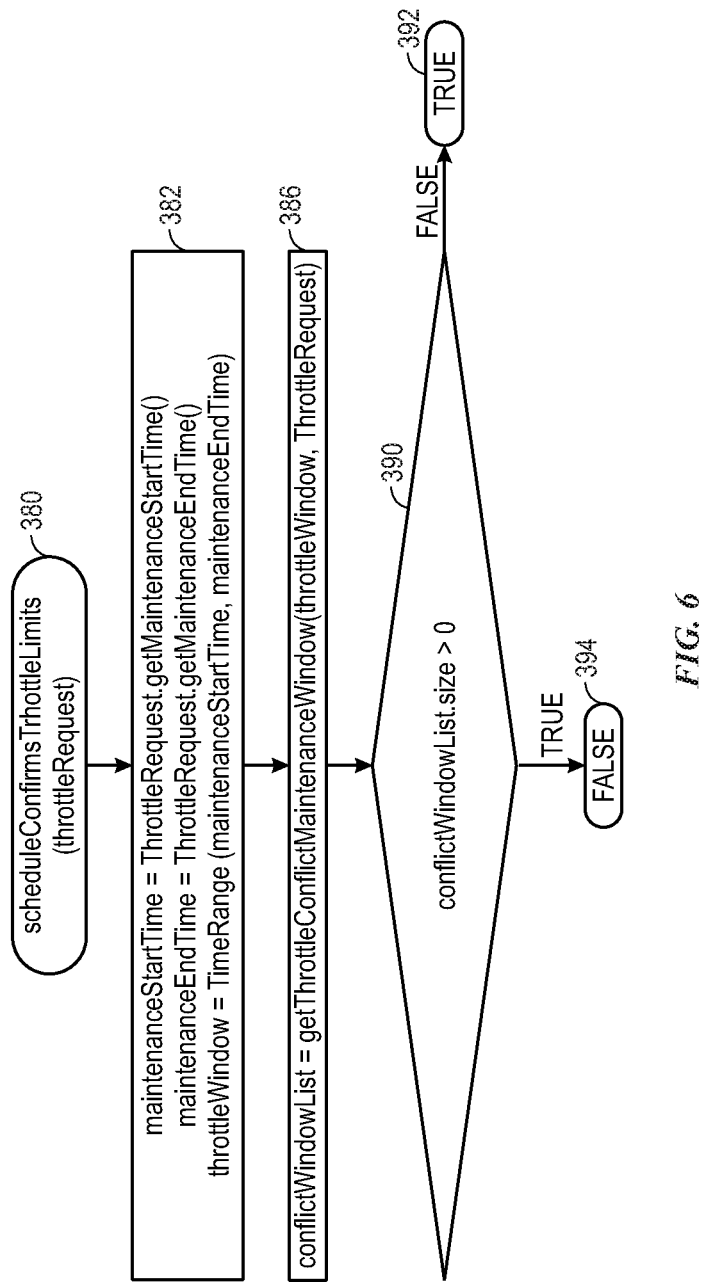
FIG. 6 depicts a high-level process flow of concurrent operation limiting process, in accordance with aspects of the present approach.

With this in mind, and turning to FIG. 6, the depicted process flow begins at step 380, with a request to confirm that a concurrency limit (i.e., throttle limit) is not exceeded for a proposed schedule for an automation. Several factors 382 are received as inputs, derived, or retrieved from a data store as previously defined. In this example, the factors or inputs are the start time and end time for the proposed automation and the throttle window, which is determined by the start time and end time and corresponds to the time over which the automation is proposed to run.

The throttle window may be used as a call to an internal function that generates (step 386) a list of conflicts within the throttle window based on the limit specified for automations of the type which is being scheduled. If there are no identified conflicts, as determined at decision block 390, the automation may be scheduled (block 392). If one or more conflicts are identified, the automation may be prevented from being scheduled (block 394) and information is provided to the user or administrator to allow them to adjust scheduling of the automation accordingly.

Pseudo code corresponding to the steps depicted in FIG. 6 may correspond to the following:

```
OperationThrottler.scheduleConfirmsThrottleLimits(ThrottleRequest):
1.      maintenanceStartTime = ThrottleRequest.getMaintenanceStartTime( )
2.      maintenanceEndTime = ThrottleRequest.getMaintenanceEndTime( )
3.      throttleWindow = TimeRange
        (maintenanceStartTime,maintenanceEndTime)
4.      conflictWindowList = getThrottleConflictInMaintenanceWindow
        (throttleWindow, ThrottleRequest)
5.      if ( conflictWindowList.size( ) > 0 )
   5.1      return false
6.      else
   6.1      return true
```

With respect to the called internal function relevant to step 386 that generates a list of possible conflicts within the throttle window based on the limit specified for automations of the type which is being scheduled, this function fetches the scheduled operations for each resource identifier relevant to the incoming throttle request (i.e., concurrency check) and identifies those time windows or intervals having more concurrent automations (including the requested automation) than are allowed based on the concurrency limitation (i.e., throttle limit). All conflicting windows are identified for each affected resource and these windows are merged or otherwise combined to generate a time-based list of non-overlapping concurrency conflicted windows or time intervals, as shown in the right hand column of FIG. 5.

Figure 7:
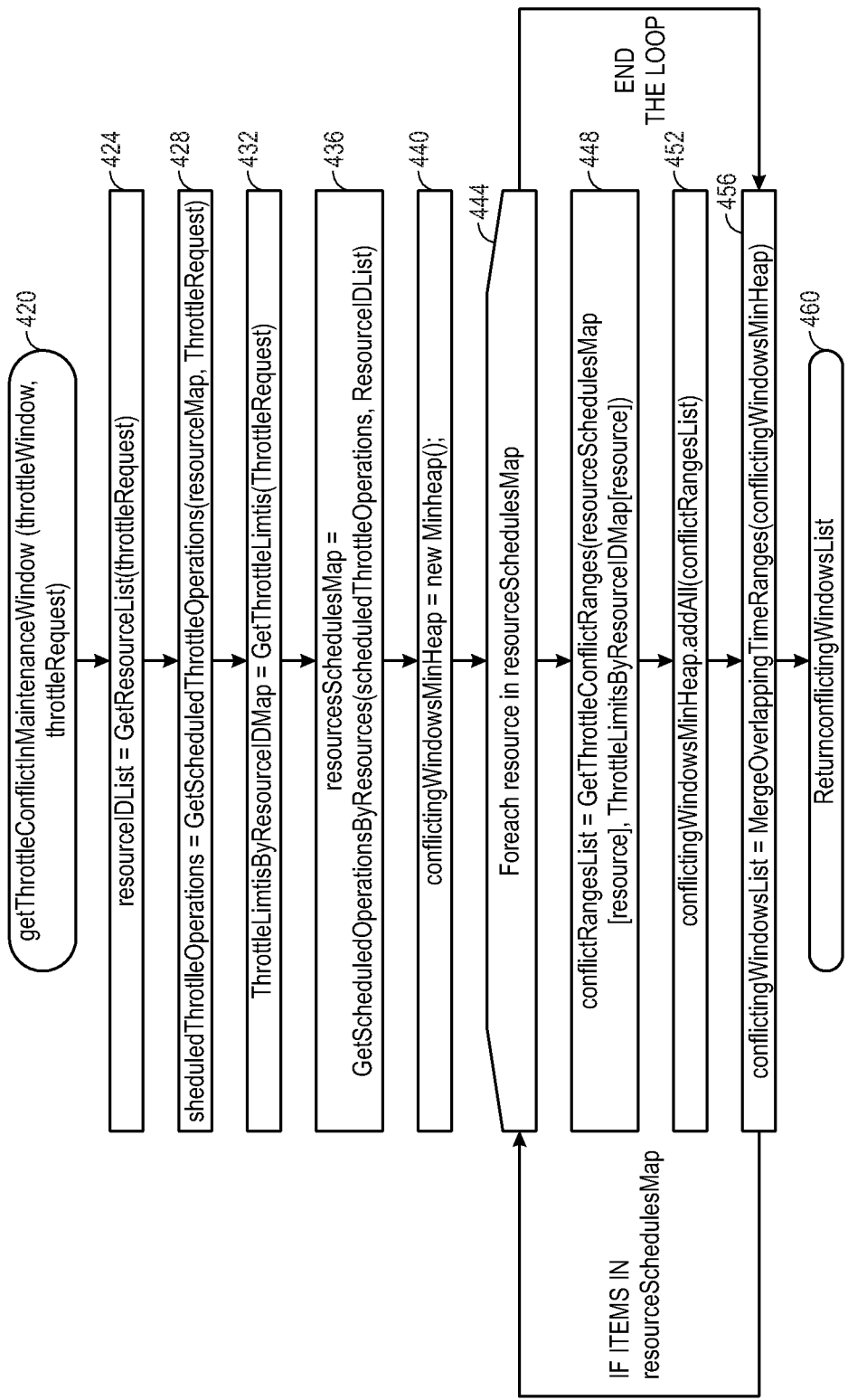
FIG. 7 depicts a process flow of steps for determining conflict windows, in accordance with aspects of the present approach.

With this in mind, and turning to FIG. 7, the depicted process flow begins at step 420, when the internal function call is received to generate the list of conflicts within the throttle window based on the limit specified for automations of the type which is being scheduled. Based on this call, a list of the resources impacted or affected by the automation being scheduled is generated (step 424) and a resource map of affected resources is generated (step 428) including scheduled relevant automations by resource. Concurrency limits based on affected resource are acquired (step 432) and a resource schedule map is generated (step 436) based on resources and relevant scheduled automations.

Based on these factors, an iterative loop is implemented to determine (step 440) time conflicting windows in which the concurrency limit (i.e., resource throttle) for an affected or impacted resource is exceeded based on the proposed scheduling of a given automation. With respect to the depicted loop, for each potentially impacted resource (step 444), a conflict time range list is generated (step 448) and time conflict windows are identified (step 452) for which the concurrency criteria (i.e., throttle limits) are violated by the automation being scheduled. If impacted resources remain to be processed, the loop is iterated for the next resource. Once all resources have been processed in this manner, the loop is exited, and the aggregated list of conflicts within the throttle window based on resources and the limit specified for automations of the type which is being scheduled is output (step 456) and returned to the function that initiated the call (step 460).

Pseudo code corresponding to the steps depicted in FIG. 7 may correspond to the following. It may be noted that in this and other pseudo code examples herein, as well as the corresponding depicted process flows, MinHeap operations may be shown by way of illustration in order to simplify details. It should be appreciated, however, that any data structure that has lists of elements and provides for the retrieval of elements in a sorted order can be used in place of the MinHeap operation in this and other example herein.

```
OperationThrottler.getThrottleConflictInMaintenanceWindow
        (throttleWindow, ThrottleRequest):
1.      resourceIDList = GetResourceList(ThrottleRequest)
2.      scheduledThrottleOperations = GetScheduledThrottleOperations
        (resourceMap, ThrottleRequest)
3.      ThrottleLimitsByResourceIDMap = GetThrottleLimits
        (ThrottleRequest)
4.      resourceSchedulesMap = GetScheduledOperationsByResources
        (scheduledThrottleOperations, resourceIDList)
5.      conflictingWindowsMinHeap = new MinHeap( );
6.      For each resource in resourceSchedulesMap.Keys( ):
   6.1      conflictRangesList = GetThrottleConflictRanges
            (resourceSchedulesMap [resource],
            ThrottleLimitsByResourceIDMap[resource])
   6.2      conflictingWindowsMinHeap.addAll(conflictRangesList)
7.      conflictingWindowsList = MergeOverlappingTimeRanges
        (conflictingWindowsMinHeap)
8.      Return conflictingWindowsList
```

With respect to the iterated loop illustrated in FIG. 7, this operation may be provided as an algorithm that is optimized or otherwise tuned to find the count of overlapping operations (i.e., automations) in O(n) time using a sorted list of time objects. In one implementation, as discussed above, this sorting is achieved using a MinHeap data structure, thereby providing O(log n) sort time complexity.

Figure 8A:
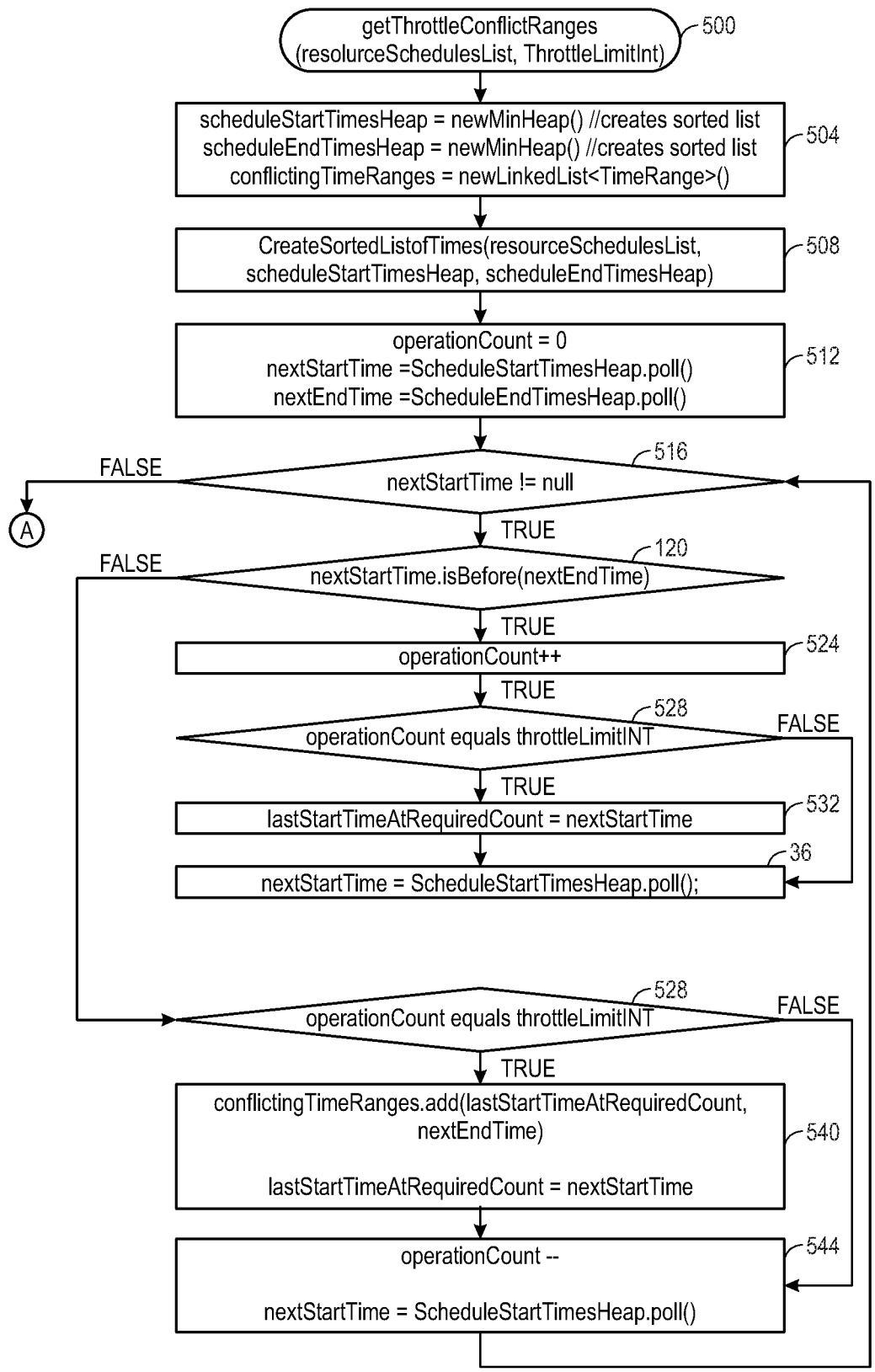
FIGS. 8A and 8B in combination depicts a process flow of steps for determining concurrency conflicts, in accordance with aspects of the present approach.
Figure 8B:
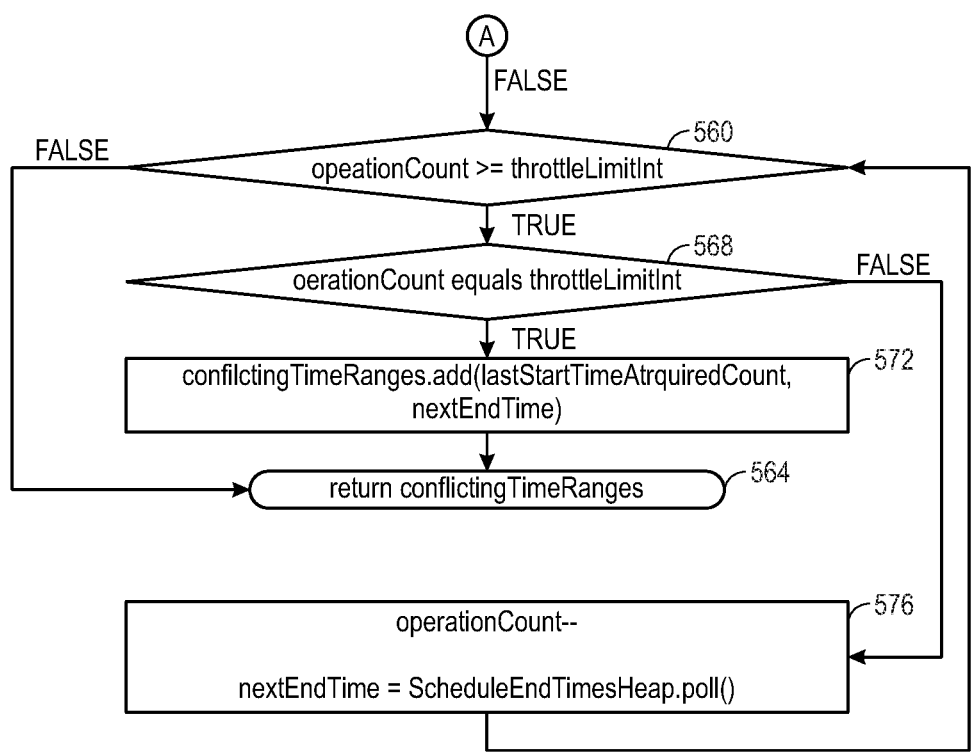

With this in mind, and turning to FIGS. 8A and 8B, a process flow corresponding to one such algorithm is illustrated. The process flow begins at step 500 with a call to get or identify time ranges having concurrency violation (i.e., throttle conflict) for the automation being scheduled. Based on this call, schedule start and end time heaps and a conflicting time range list are initialized (step 504). A sorted list of times is created based on resource automation schedules (step 508) that includes start and end times for scheduled automations. Automation count is set to zero or otherwise initialized (step 512) prior to iterating through the resource schedules.

A determination (decision block 516) is made as to whether there are scheduled automations remaining to be processed. If automations remain, processing advances to the next scheduled operation and a determination is made (decision block 520) as to whether the next start time is before the next end time (i.e., does the next scheduled automation overlap with an existing automation). If yes, the automation or operation count is incremented (step 524) and a determination (decision block 528) is made as to whether the automation or operation or automation count equals the concurrency limit (i.e., throttle limit). Based on this determination, the next start time to be processed at step 516 is determined (steps 532, 536).

Returning to decision block 520, if a determination is made that the next start time is not before the next end time (i.e., no overlap), a determination is made (decision block 528) as to whether the current automation or operation count at the currently processed time equals the limit (i.e., throttle limit) specified for concurrent automations of the type being scheduled. Based on this determination, the next start time to be processed at step 516 is determined (steps 540, 544) and processing proceeds.

Returning to decision block 516, if a determination is made that there is are no remaining automations to process (e.g., no remaining start times), a determination is made (decision block 560) as to whether the operation count equals or exceeds the limit (i.e., throttle limit) specified for concurrent automations of the type being scheduled. If not, the conflicting time ranges are returned (step 564) indicating that the conflicts, if any, do not exceed the limits set for concurrent operations and the automation in question may be scheduled as proposed. If the operation count equals or exceeds the limit (i.e., throttle limit), a determination may be made (decision block 568) as to whether the operation count is equaled or is exceeded and additional steps may be performed based on whether the limit is equaled (step 572) or is exceeded (step 576).

Pseudo code corresponding to the steps depicted in FIG. 6 may correspond to the following:

```
OperationThrottler.getThrottleConflictRanges
            (resourceSchedulesList,throttleLimitInt):
1.          ScheduleStartTimesHeap = new MinHeap( )
2.          ScheduleEndTimesHeap = new MinHeap( )
3.          conflictingTimeRanges = new LinkedList<TimeRange>( )
4.          For resourceSchedule in resourceSchedulesList:
    4.1         ScheduleStartTimesHeap.add(resourceSchedule.startTime)
    4.2         ScheduleEndTimesHeap.add(resourceSchedule.endTime)
5.          operationCount = 0
6.          nextStartTime = ScheduleStartTimesHeap.poll( )
7.          nextEndTime = ScheduleEndTimesHeap.poll( )
8.          while(nextStartTime!=null)
    8.1         if (nextStartTime.compareTo(nextEndTime) <= 0)
        8.1.1       ++operationCount;
        8.1.2       if (operationCount == throttleLimitInt)
            8.1.2.1     lastStartTimeAtRequiredCount = nextStartTime;
        8.1.3       nextStartTime = ScheduleStartTimesHeap.poll( );
    8.2         else
        8.2.1       if (operationCount == throttleLimitInt)
            8.2.1.1     conflictingTimeRanges.add
                            (lastStartTimeAtRequiredCount, nextEndTime)
            8.2.1.2     lastStartTimeAtRequiredCount = nextStartTime
        8.2.2       -- operationCount;
        8.2.3       nextEndTime = ScheduleEndTimesHeap.poll( );
9.          while (operationCount >= throttleLimitInt)
    9.1         if (operationCount == throttleLimitInt)
        9.1.1           conflictingTimeRanges
                            (lastStartTimeAtRequiredCount,nextEndTime)
        9.1.2       break;
    9.2             --operationCount
nextEndTime = ScheduleEndTimesHeap.poll( )
```

Figure 9:
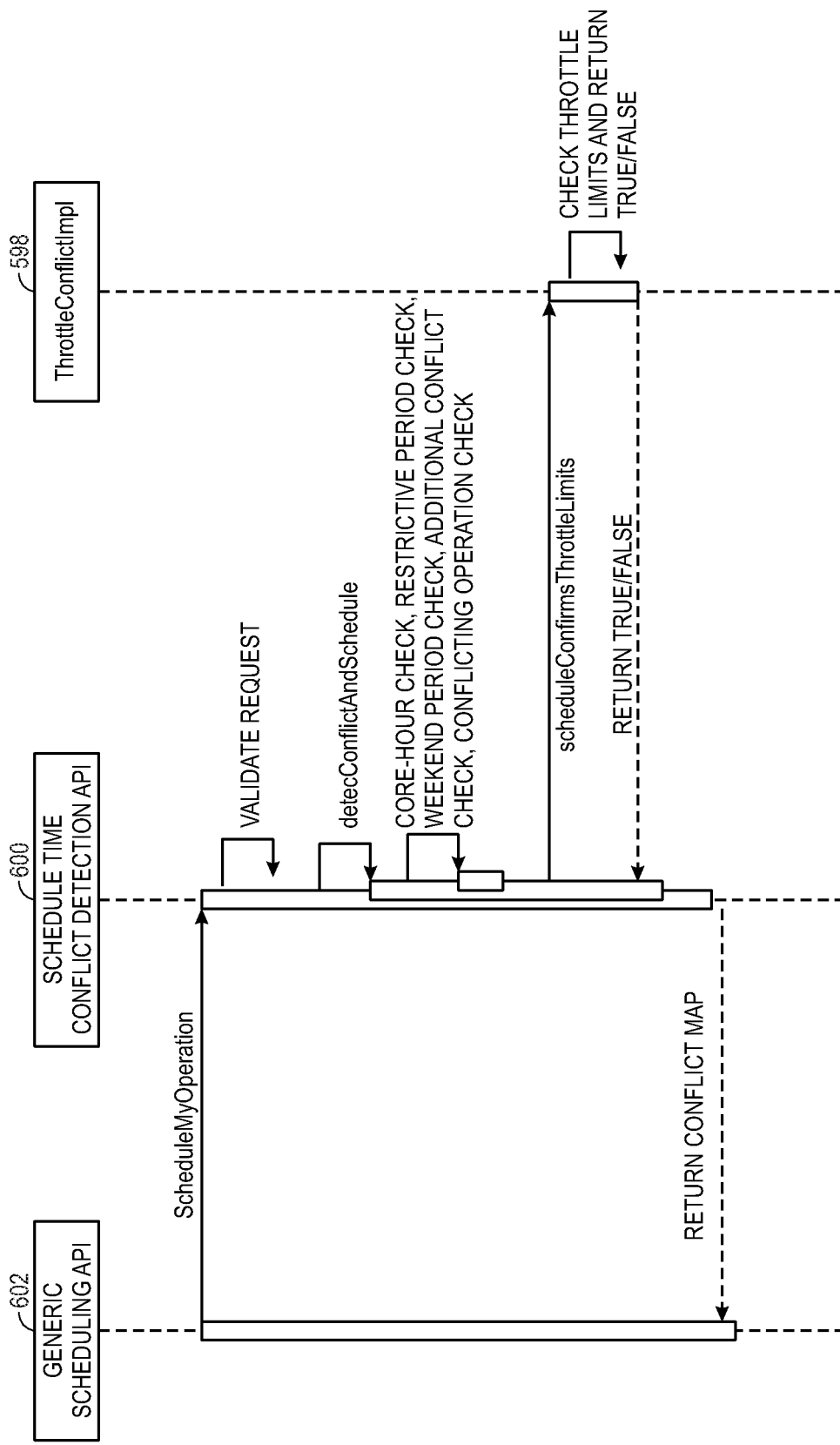
FIG. 9 depicts a high-level view of incorporation of a concurrent operation conflict check in a scheduling application programing interface, in accordance with aspects of the present approach.

Turning to FIG. 9, a high-level use case is illustrated for the above described throttle conflict algorithm. In particular, in a real-world implementation, the present approach may be provided as an aspect or feature 598 of a conflict detection API 600 provided as part of an overall scheduling API 602. In the depicted example, the scheduling API 602 may be called in response to a user attempting to schedule an operation or automation. As part of the scheduling process, the conflict detection API 600 may be called and perform steps such as validating the schedule request, detecting conflicts based on various defined criteria, and in accordance with the present approach, calling the present functions or routines to confirm that automation concurrency limitations (i.e., throttle limits) are met. Thus, the presently disclose approach may be provided as part of a larger conflict detection aspect of an operation scheduling routine or module.

With the preceding discussion in mind, a further example of an1 provides a sample of data illustrating certain of the present concepts, though it should be appreciated that in a real-world implementation, other meta data may also be stored and/or utilized.

TABLE 1

Operation Throttling Resource Limits (applicable to standalone and suboperations)

| Operation Name | Group Name | Resource Type | Throttle Limit |
|---|---|---|---|
| Restore | Restore_default_group_POD | POD | 50 |
| Restore | Restore_default_group_DB_SERVER | DB SERVER | 3 |
| Restore | Bandwidth_group_POD | POD | 100 |
| Restore | Bandwidth_group_DB_SERVER | DB SERVER | 5 |
| Move | Bandwidth_group_POD | POD | 100 |
| Move | Bandwidth_group_DB_SERVER | DB SERVER | 5 |
| Upgrade | Bandwidth_group_POD | POD | 100 |
| Upgrade | Bandwidth_group_DB_SERVER | DB SERVER | 5 |
| Clone | Clone_default_group_POD | POD | 20 |
| Clone | Clone_default_group_DB_SERVER | DB SERVER | 2 |
| Transfer | AHA_default_group_APP_SERVER | APP SERVER | 10 |
| Upgrade | Upgrade_default_group_DB_SERVER | DB SERVER | 3 |
| Upgrade | Fast_updates_group_POD | POD | 200 |
| Upgrade | Fast_updates_group_DB_SERVER | DB SERVER | 15 |
| Patch | Fast_updates_group_POD | POD | 200 |
| Patch | Fast_updates_group_DB_SERVER | DB SERVER | 15 |

With respect to the denoted resource types, a POD may be construed as any pod on which the operation in question needs to be throttled, and may be a primary pod, standby pod, or destination pod. Application servers are denoted as APP SERVER and databases servers are denoted as DB SERVER. For the present discussion the Resource Type can also be a SERVER, in respect of automations that do not differentiate based on server usage, where such automation could be operating system (OS) patching, OS upgrade, server maintenance, etc.

With the preceding examples and discussion in mind and the sample table schema described in Table 1, the throttling logic finds the throttle limits in following sequence:
1. For a resource, find all groups. Groups can be single operation default groups or multiple operation groups.
2. Find all operations in all groups
3. Count all operations scheduled in given window and ensure counts do not exceed the throttle limit for any group.

The preceding discussion and examples relate to limiting the number of concurrently running operations so as to allow unimpaired operation of a client instance (or other aspect of a cloud platform). The following discussion and examples describe a further approach that may be employed in addition to or instead of the approach described above. In particular, in this further approach, staggering of operation start times (e.g., an operation staggered start service executing on a server or other processor-based device supporting a given instance) is employed that acts to limit the number of operations or automations starting at a given time as per a defined stagger rate and stagger window. Such staggered starts may be useful when the initial phase of an operation or automation is resource intensive (such as due to resources being allocated, data structures being initialized, queries being performed or initiated, and so forth), with resources being less impacted once initial activity has been performed. Such start-up limitations may apply globally to all automations or may apply only to certain automations or types of automations (e.g., certain types of automations may be limited in terms of the number which may be started near in time to one another while others are not so limited or different types of automations may have different start-up limitations, such as based upon their impact on resources). Operation staggering as discussed herein may support any suitable resource in a cloud infrastructure (e.g., application servers, database server, network infrastructure, disk and processor resources, and so forth) and/or may be used to stagger start times for suitable automations (e.g., Upgrade, Move, Clone, Transfer, and so forth). It should be noted that operation staggering, as discussed herein, may be employed in conjunction with resource throttling as described above. By way of example, in one implementation if a resource throttle configuration is defined for an operation, then operation staggering may be applied to resources only, otherwise operation staggering may be applied globally Further, as with resource throttling, resource characteristics may be taken into account as part of operation staggering, which may help address a lack of homogeneity typical in IT environments. In addition, as noted with respect to resource throttling, the automations themselves are not homogeneous, but may be of varying types and may vary in resource impact. These factors may be taken into account in accordance with the present approach in terms of setting start time staggering for total and/or specific automations. By way of example, in one implementation a restore operation may have a stagger rate of 2 and a stagger window of 20 minutes, while a move operation may also have a stagger rate of 2, but a stagger window of 30 minutes. The present operation staggering approach can thereby be used to optimize or maximize automation throughput within considered resource usage limits by taking into account these varying factors as part of start time staggering (such as by setting a suitable start time stagger threshold for total or specific automations of a given set of resources).

To facilitate explanation and discussion of the present approaches, various examples of process flows and corresponding pseudocode are provided below. In these examples, concepts and terms are provided in the context of a platform employing a configuration management database (CMDB)-based platform, as in the preceding discussion.

With the preceding in mind, FIG. 10 depicts a visual representation of a timeline in which an automation is to be scheduled. In this example, for the automation or automation type in question the stagger window is seven minutes and the stagger rate is two (i.e., no more than two automations of this type may be started within seven minutes of one another). The time dimension and particular times are reflected vertically in the figure along with a vertical bar 700 representing the stagger lookup window. Vertically adjacent, other scheduled automations or operations 354 are illustrated along the same time dimension. Based on the defined stagger rate and stagger window limitations for this example, conflicting time windows 702 are present where the proposed start time would be inconsistent with the defined stagger rate and stagger window for this type of automation. Based on this result, the start of the proposed automation at the proposed time would be staggered so as to be outside of the identified conflict windows 702. The present approach relates algorithms for identifying such conflicting start time windows in an automated manner and providing such conflicts to a user to allow scheduling of automations so as to avoid such conflicts. As may be appreciated such algorithms may be implemented as automated services or processes on a device running on a client instance 102 or at a data center in support of the client instance 102.

With this in mind, and turning to FIG. 11, a process flow is illustrated in conjunction with pseudo code (below) that may be executed to determine the presence or absence of conflict start time conflicts based on defined stagger criteria. In this example, the algorithm steps may be implemented as a high-level application programming interface (API) that can be used to check stagger rate for a given maintenance window. The API receives input data in a specified format and calls an internal function, described in greater detail below. Nomenclature employed corresponds generally to conventional instruction and argument representation practices and should be understood to be representative of the general logic and arguments employed and not exclusive or exhaustive of such approaches.

Figure 11:
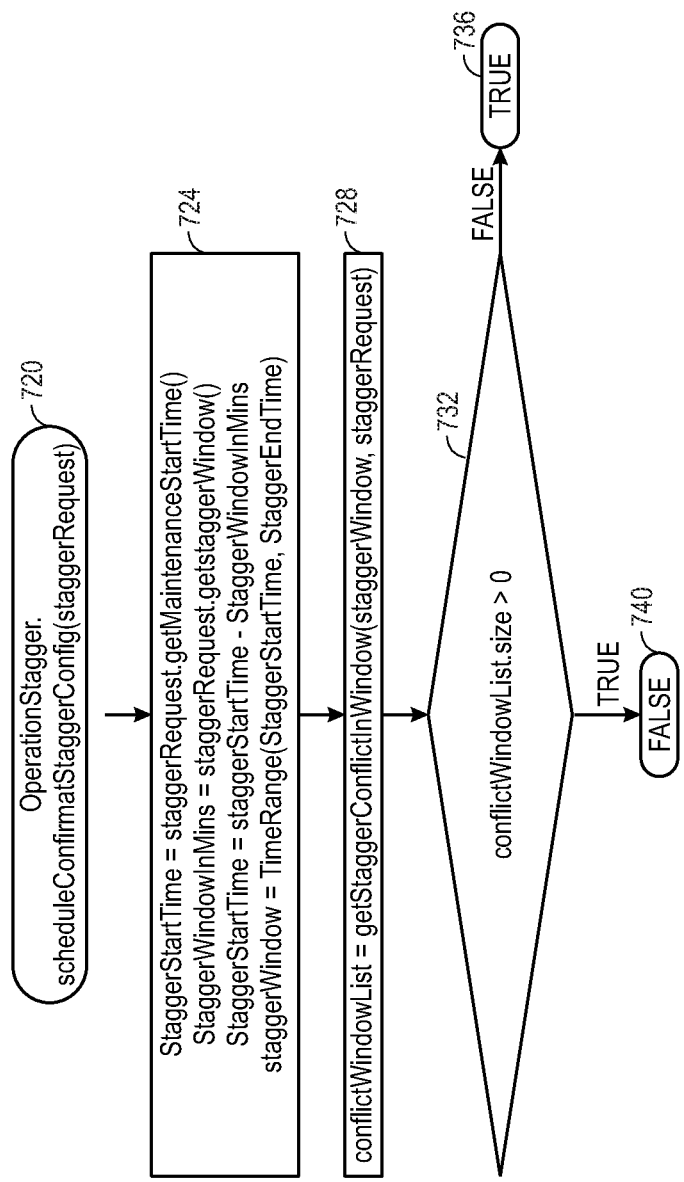
FIG. 11 depicts a high-level process flow of a staggered start process, in accordance with aspects of the present approach.

With this in mind, and turning to FIG. 11, the depicted process flow begins at step 720, with a request to confirm that a concurrent start-up limitation (i.e., stagger rate) is not exceeded for a proposed schedule for an automation. Several factors 724 are received as inputs, derived, or retrieved from a data store as previously defined. In this example, the factors or inputs include, but are not limited to, the respective requested automation start time, stagger duration, derived stagger end time, and so forth.

The start conflict window may be used as a call to an internal function that generates (step 728) a list of conflicts based on staggered start criteria for automations of the type which is being scheduled. If there are no identified conflicts, as determined at decision block 732, the automation may be scheduled (block 736). If one or more conflicts are identified, the automation may be prevented from being scheduled (block 740) and information is provided to the user or administrator to allow them to adjust scheduling of the automation accordingly.

Pseudo code corresponding to the steps depicted in FIG. 11 may correspond to the following:

With respect to the called internal function relevant to step 728 that generates a list of possible conflicts based on staggered start criteria for automations of the type which is being scheduled, this function fetches the scheduled operations for each resource identifier relevant to the incoming stagger request (or fetched globally from scheduled operations if a resource throttle configuration is not defined for the operation) and determines the time windows or intervals that have more operations overlapping than the defined stagger rate for the stagger window of the relevant maintenance window. All conflicting windows are identified for each affected resource and these windows are merged or otherwise combined to generate a time-based list of non-overlapping stagger conflicted windows or time intervals, as shown in the right hand column of FIG. 10.

Figure 12:
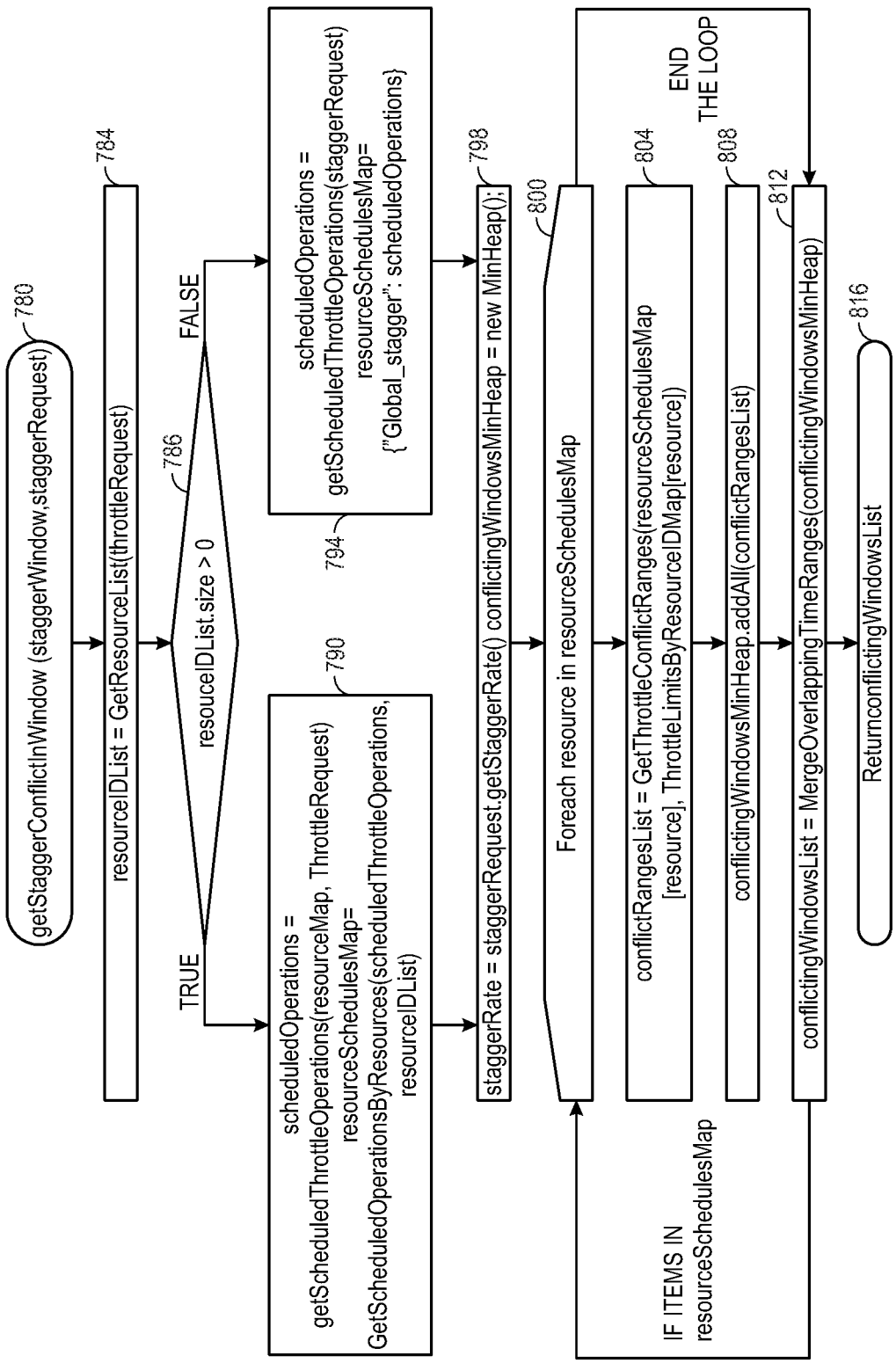
FIG. 12 depicts a process flow of steps for determining conflict windows, in accordance with aspects of the present approach.

With this in mind, and turning to FIG. 12, the depicted process flow begins at step 780, when the internal function call is received to generate the list of possible conflicts based on staggered start criteria for automations of the type which is being scheduled. Based on this call, a list of the resources impacted or affected by the automation being scheduled is generated (step 784) with, in this example, different provisions depending on whether resource throttling is being employed. A determination (decision block 786) is made as to whether the list of affected resources is or is not greater than zero with different actions (as described herein) taken to generate a resource map to be processed if resource throttling is present (step 790) or absent (step 794).

Start time stagger rate limitations are determined or acquired (step 798) and an iterative loop is implemented to determine start time conflicting windows in which the stagger rate conditions for an affected or impacted resource is exceeded based on the proposed scheduling of a given automation. With respect to the depicted loop, for each potentially impacted resource (step 800), a conflict range list is generated (step 804) and time conflict windows are identified (step 808) for which the stagger rate are violated by the automation being scheduled. If impacted resources remain to be processed, the loop is iterated for the next resource. Once all resources have been processed in this manner, the loop is exited, and the aggregated list of conflicts within the start time stagger window b for automations of the type which is being scheduled is output (step 812) and returned to the function that initiated the call (step 816).

```
OperationStagger.scheduleConfirmsStaggerConfig(staggerRequest):
1.         StaggerStartTime = staggerRequest.getMaintenanceStartTime( )
2.         StaggerWindowInMins = staggerRequest.getStaggerWindow( )
3.         StaggerEndTime = maintenanceStartTime + StaggerWindowInMins
4.         StaggerStartTime = StaggerStartTime – StaggerWindowInMins
5.         staggerWindow = TimeRange(StaggerStartTime, StaggerEndTime)
6.         conflictWindowList = getStaggerConflictInWindow
           (staggerWindow,staggerRequest)
7.         if ( conflictWindowList.size( ) > 0 )
    7.1                        return false
8.         else
    8.1                        return true
```

Pseudo code corresponding to the steps depicted in FIG. 12 may correspond to the following:

```
OperationStagger.getStaggerConflictInWindow
            (StaggerWindow,staggerRequest):
1.          resourceIDList = GetResourceList(staggerRequest)
            //If throttle resources defined do staggering based on resource IDs else
            do staggering on globally scheduled operations
2.          if (resourceIDList.size( ) > 0)
    2.1         scheduledOperations = GetScheduledThrottleOperations
                (resourceMap, staggerRequest)
    2.2         resourceSchedulesMap = GetScheduledOperationsByResources
                (scheduledThrottleOperations, resourceIDList)
3.          else
    3.1         scheduledOperations = GetScheduledOperations(staggerRequest)
    3.2         resourceSchedulesMap = {"Global_stagger": scheduledOperations }
4.          StaggerRate = staggerRequest.getStaggerRate( )
5.          conflictingWindowsMinHeap = new MinHeap( );
6.          For each resource in resourceSchedulesMap.Keys( ):
    6.1         conflictRangesList = GetStaggerConflicts
                (resourceSchedulesMap[resource], StaggerRate, StaggerWindow)
    6.2         conflictingWindowsMinHeap.addAll(conflictRangesList)
7.          conflictingWindowsList = MergeOverlappingTimeRanges
                (conflictingWindowsMinHeap)
8.          Return conflictingWindowsList;
```

With respect to the iterated loop illustrated in FIG. 12, this operation may be provided as an algorithm that is optimized or otherwise tuned to find the count of overlapping operation starts within a defined stagger window in time complexity of O(n). An example of this algorithm considers operation overlaps only at beginning of the operation from start time to stagger window. If the count of overlaps exceed the stagger rate, the window conflicts. If stagger window is X minutes, X minutes are considered before the start of incoming staggerRequest to X minutes after the start. This example algorithm creates a sorted list of time objects using a Minheap data structure to keep sort time complexity to a minimum possible of O(log n).

Figure 13A:
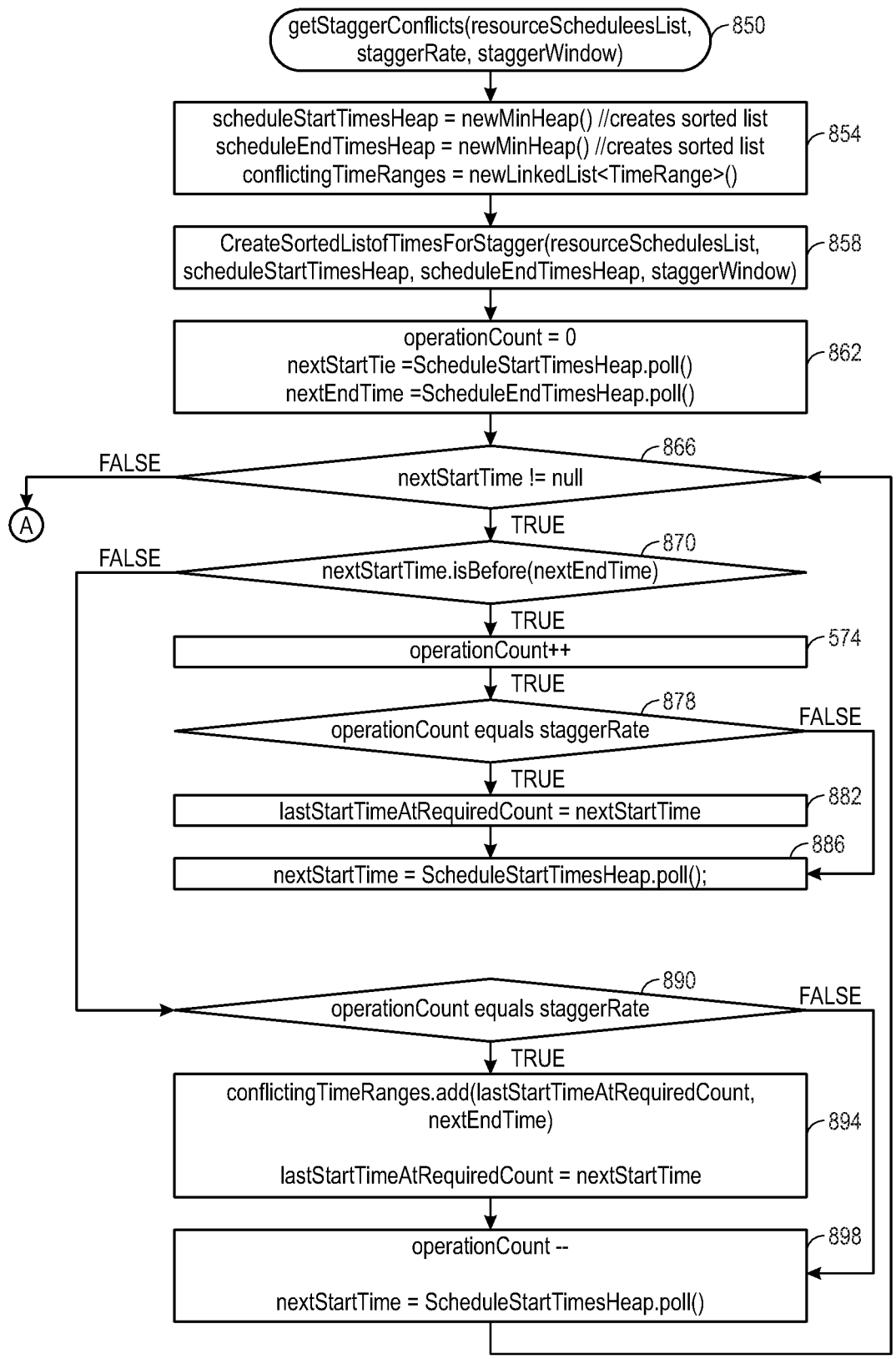
FIGS. 13A and 13B in combination depicts a process flow of steps for determining staggered start conflicts, in accordance with aspects of the present approach.
Figure 13B:
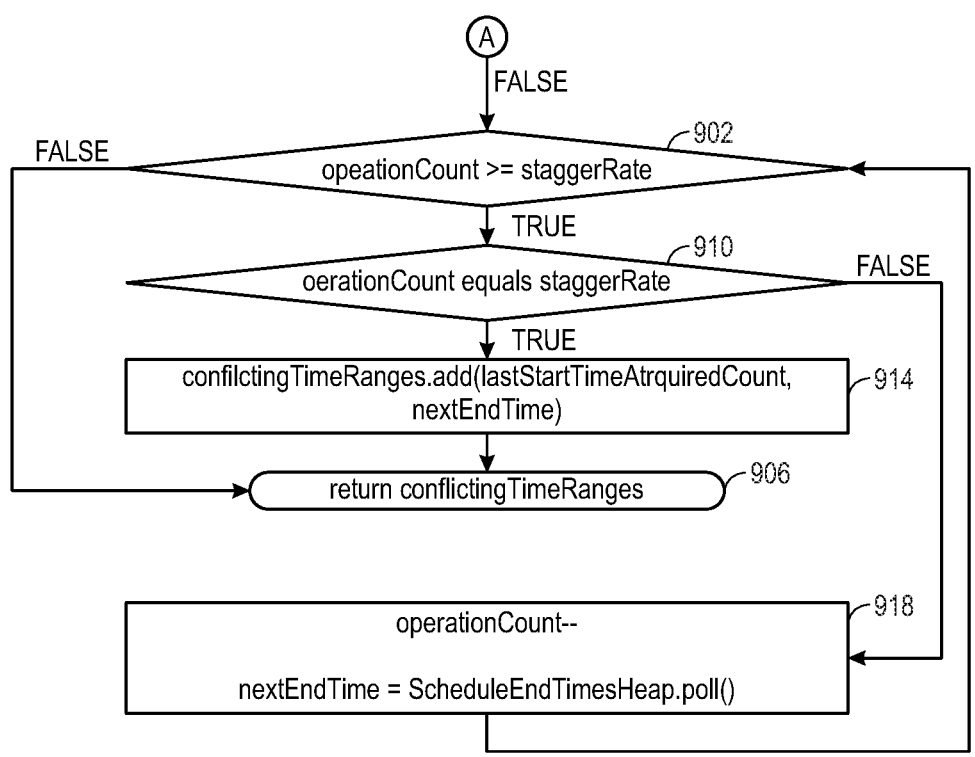

With this in mind, and turning to FIGS. 13A and 13B, a process flow corresponding to one such algorithm is illustrated. The process flow begins at step 850 with a call to get or identify time ranges having stagger rate violations (i.e., too many operations scheduled to start within a specified time interval) for the automation being scheduled. Based on this call, schedule start and end time heaps and a conflicting time range list are initialized (step 854). A sorted list of times is created based on resource automation schedules (step 858) that includes start and end times for scheduled automations as well as relevant stagger windows. Operation count is set to zero or otherwise initialized (step 862) prior to iterating through the resource schedules.

A determination (decision block 866) is made as to whether there are scheduled operations remaining to be processed. If operations remain, processing advances to the next scheduled operation and a determination is made (decision block 870) as to whether the next start time is before the next end time (i.e., does the next scheduled automation overlap with an existing automation). If yes, the automation or operation count is incremented (step 874) and a determination (decision block 878) is made as to whether the automation or operation or automation count equals the stagger rate. Based on this determination, the next start time to be processed at step 866 is determined (steps 882, 886).

Returning to decision block 870, if a determination is made that the next start time is not before the next end time (i.e., no overlap), a determination is made (decision block 890) as to whether the current automation or operation count at the currently processed time equals the specified stagger rate for automations of the type being scheduled. Based on this determination, the next start time to be processed at step 866 is determined (steps 894, 898) and processing proceeds.

Returning to decision block 866, if a determination is made that there is are no remaining operations to process (e.g., no remaining start times), a determination is made (decision block 902) as to whether the operation count equals or exceeds the limit (i.e., the stagger rate) specified for automations of the type being scheduled. If not, the conflicting time ranges are returned (step 906) indicating that the conflicts, if any, do not exceed the limits set for concurrent operations and the automation in question may be scheduled as proposed. If the operation count equals or exceeds the stagger rate, a determination may be made (decision block 910) as to whether the operation count is equaled or is exceeded and additional steps may be performed based on whether the limit is equaled (step 914) or is exceeded (step 918).

Pseudo code corresponding to the steps depicted in FIGS. 13A and 13B may correspond to the following:

```
OperationStagger.getStaggerConflicts
            (resourceSchedulesList,staggerRate,staggerWindow):
1.          ScheduleStartTimesHeap = new MinHeap( )
2.          ScheduleEndTimesHeap = new MinHeap( )
3.          conflictingTimeRanges = new LinkedList<TimeRange>( )
4.          For resourceSchedule in resourceSchedulesList:
    4.1         ScheduleStartTimesHeap.add(resourceSchedule.startTime)
    4.2         ScheduleEndTimesHeap.add
                (resourceSchedule.startTime+staggerWindow)
5.          operationCount = 0
6.          nextStartTime = ScheduleStartTimesHeap.poll( )
```

```
7.      nextEndTime = ScheduleEndTimesHeap.poll( )
8.      while(nextStartTime!=null)
    8.1 if (nextStartTime.compareTo(nextEndTime) <= 0)
        8.1.1           ++opCount;
        8.1.2           if (opCount == staggerRate)
            8.1.2.1lastStartTimeAtRequiredCount = nextStartTime;
        8.1.3           nextStartTime = ScheduleStartTimesHeap.poll( );
    8.2 else
        8.2.1           if (opCount == staggerRate)
            8.2.1.1             conflictingTimeRanges.add
                                (lastStartTimeAtRequiredCount, nextEndTime)
            8.2.1.2             lastStartTimeAtRequiredCount = nextStartTime
        8.2.2           --opCount;
        8.2.3           nextEndTime = ScheduleEndTimesHeap.poll( );
9.      while (opCount >= staggerRate)
    9.1 if (opCount == staggerRate)
        9.1.1           conflictingTimeRanges
                        (lastStartTimeAtRequiredCount,nextEndTime)
        9.1.2           break;
    9.2 --opCount
    9.3 nextEndTime = ScheduleEndTimesHeap.poll( )
10.     return conflictingTimeRanges
```

Figure 14:
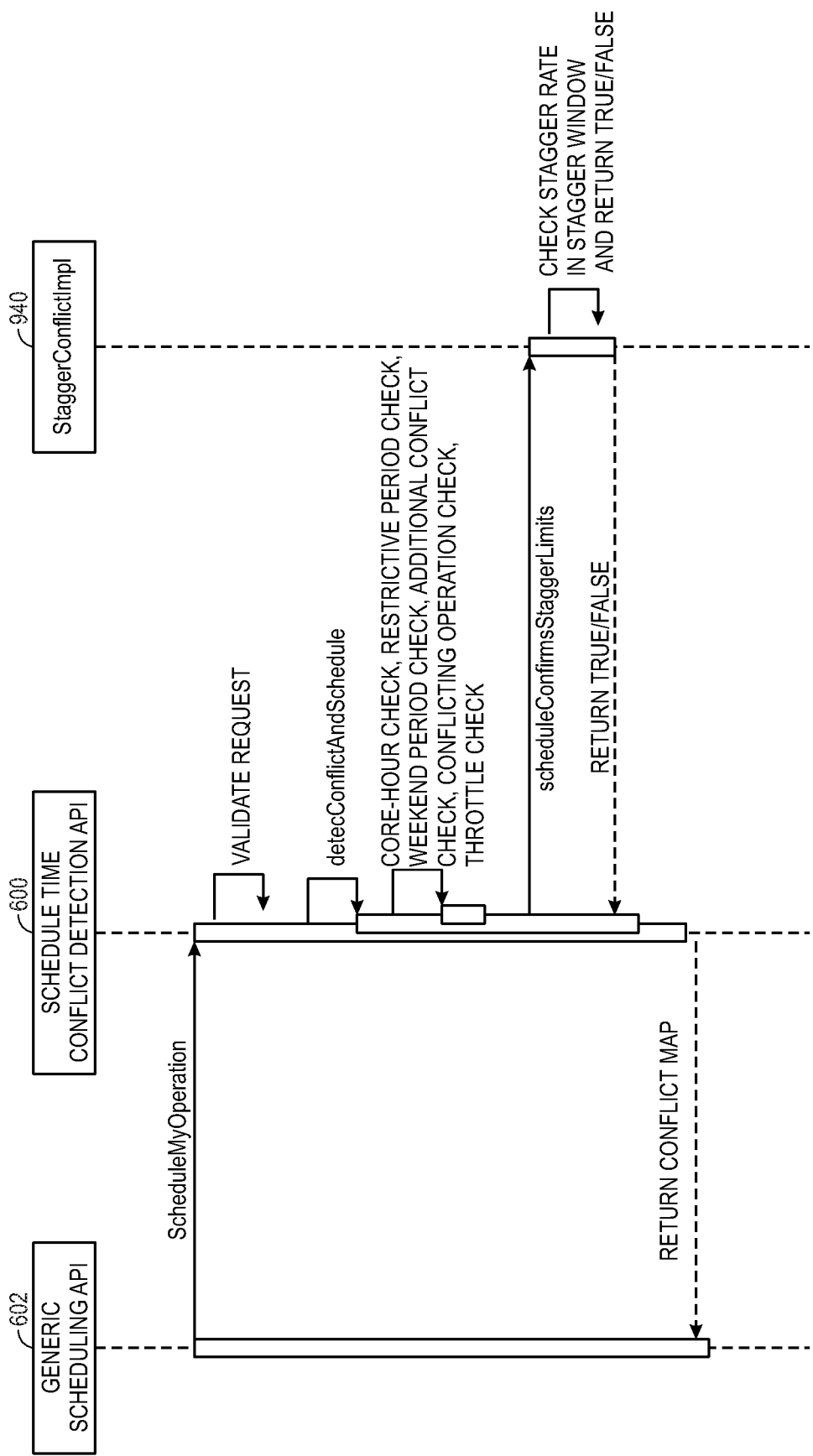
FIG. 14 depicts a high-level view of incorporation of a staggered start conflict check in a scheduling application programing interface, in accordance with aspects of the present approach.

Turning to FIG. 14, a high-level use case is illustrated for the above described stagger conflict check algorithm. In particular, in a real-world implementation, the present approach may be provided as an aspect or feature 940 of a conflict detection API 600 provided as part of an overall scheduling API 602. In the depicted example, the scheduling API 602 may be called in response to a user attempting to schedule an operation or automation. As part of the scheduling process, the conflict detection API 600 may be called and perform steps such as validating the schedule request, detecting conflicts based on various defined criteria, and in accordance with the present approach, calling the present functions or routines to confirm that staggered start limitations are met. Thus, the presently disclose approach may be provided as part of a larger conflict detection aspect of an operation scheduling routine or module.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A system, comprising:
a data center comprising one or more resources; and
one or more client instances hosted on the one or more resources, wherein the one or more client instances are accessible by a remote client network, and wherein the system is configured to perform operations comprising:
in response to a request to schedule an automated operation of a particular type or category of automated operation within a stagger window and at a stagger rate associated with the particular type or category, determining each occurrence of the automated operation of the particular type or category starting within the stagger window with one or more other operations starting, impacting the one or more resources, wherein the stagger window comprises a time frame for temporarily staggering a starting of each occurrence of the automated operation and the stagger rate comprises a limitation on a number of occurrences of the automated operation started with respect to one another within the stagger window;
for each time interval in which the automated operation is determined to start within the stagger window with the one or more other operations and for which a total number of starting operations within the stagger window exceeds the stagger rate, identifying a respective conflict window; and
returning a list of identified conflict windows in response to the request.

2. The system of claim 1, wherein the automated operation of the particular type or category comprises one or more of an upgrade operation, a move operation, a clone operation, a patch operation, a restore operation, a backup operation, a copy operation, a stop or start operation, a provisioning operation, a restart operation, a write audit operation, a read audit operation, a rename operation, a repoint operation, or a transfer operation.

3. The system of claim 1, wherein determining each occurrence of the automated operation of the particular type or category starting within the stagger window with the one or more other operations starting is limited to one or more resources impacted by the operations.

4. The system of claim 1, wherein the impacted one or more resources are associated with a resource throttle defined for the automated operation of the particular type or category.

5. The system of claim 1, wherein determining each occurrence of the automated operation of the particular type or category starting within the stagger window with the one or more other operations starting is limited to one or more resources impacted by the automated operation of the particular type or category and the one or more other operations.

6. The system of claim 5, wherein the one or more resources have different stagger rates and stagger windows used to identify start conflict windows.

7. The system of claim 1, wherein determining each occurrence of the automated operation of the particular type or category starting within the stagger window with the one or more other operations starting is limited to the particular type or category of operation.

8. The system of claim 5, wherein different automated operations of the particular type or category have different stagger rates and stagger windows used to identify start conflict windows.

9. A non-transitory computer-readable storage medium, comprising executable instructions that, when executed by a processor, facilitate performance of operations, comprising acts of:
- in response to a request to schedule an automated operation of a particular type or category of automated operation within a stagger window and at a stagger rate associated with the particular type or category, determining each occurrence of the automated operation of the particular type or category starting within the stagger window with one or more other operations starting, impacting one or more resources of a cloud platform, wherein the stagger window comprises a time frame for temporarily staggering a starting of each occurrence of the automated operation and the stagger rate comprises a limitation on a number of occurrences of the automated operation started with respect to one another within the stagger window;
- for each time interval in which the automated operation is determined to start within the stagger window with the one or more other operations and for which a total number of starting operations within the stagger window exceeds the stagger rate, identifying a respective conflict window; and
- returning a list of identified conflict windows in response to the request.

10. The non-transitory, computer-readable storage medium of claim 9, wherein determining each occurrence of the automated operation of the particular type or category starting within the stagger window with the one or more other operations is limited to the one or more resources impacted by the one or more operations.

11. The non-transitory, computer-readable storage medium of claim 10, wherein the one or more resources have different stagger rates and stagger windows used to identify conflict windows.

12. The non-transitory, computer-readable storage medium of claim 9, wherein different automated operations of the particular type or category have different stagger rates used to identify conflict windows.

13. A method for managing one or more resources of a cloud platform, comprising acts of:
- in response to a request to schedule an automated operation of a particular type or category of automated operation within a stagger window and at a stagger rate associated with the particular type or category, determining each occurrence of the automated operation of the particular type or category starting within the stagger window with one or more other operations starting, impacting the one or more resources, wherein the stagger window comprises a time frame for temporarily staggering a starting of running each occurrence of the automated operation and the stagger rate comprises a limitation on a number of occurrences of the automated operation started with respect to one another within the stagger window;
- for each time interval in which the automated operation is determined to start within the stagger window with the one or more other operations and for which a total number of starting operations within the stagger window exceeds the stagger rate, identifying a respective start conflict window; and
- returning a list of identified start conflict windows in response to the request.

14. The method of claim 13, wherein determining each occurrence of the automated operation of the particular type or category starting within the stagger window with one or more other operations starting is limited to one or more resources impacted by the one or more operations.

\* \* \* \* \*